(12) United States Patent
Zhu et al.

(10) Patent No.: US 9,572,045 B2
(45) Date of Patent: Feb. 14, 2017

(54) METHOD AND SYSTEM FOR ACTIVATING A FEMTO BASE STATION

(75) Inventors: Chenxi Zhu, Gaithersburg, MD (US); Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 221 days.

(21) Appl. No.: 12/881,907

(22) Filed: Sep. 14, 2010

(65) Prior Publication Data

US 2012/0064901 A1    Mar. 15, 2012

(51) Int. Cl.
| | |
|---|---|
| *H04W 36/00* | (2009.01) |
| *H04W 24/02* | (2009.01) |
| *H04W 52/02* | (2009.01) |
| *H04W 84/04* | (2009.01) |

(52) U.S. Cl.
CPC ......... *H04W 24/02* (2013.01); *H04W 52/0206* (2013.01); *H04W 84/045* (2013.01); *Y02B 60/50* (2013.01)

(58) Field of Classification Search
CPC .................................................... H04W 84/45
See application file for complete search history.

(56) References Cited

U.S. PATENT DOCUMENTS

| | | | |
|---|---|---|---|
| 2002/0086674 A1* | 7/2002 | Jung ................. | H04L 29/12009 455/436 |
| 2005/0153736 A1 | 7/2005 | Ganton | |
| 2007/0066329 A1 | 3/2007 | Laroia et al. | |
| 2007/0183364 A1 | 8/2007 | Donovan et al. | |
| 2008/0080427 A1* | 4/2008 | Suh ................... | H04W 36/0033 370/331 |
| 2008/0159282 A1* | 7/2008 | Song ...................... | H04W 8/04 370/389 |
| 2009/0298515 A1* | 12/2009 | Czaja ..................... | H04L 7/041 455/456.5 |
| 2010/0022698 A1 | 1/2010 | Lombino et al. ............. 524/494 | |
| 2010/0027818 A1 | 2/2010 | Lee et al. | |
| 2010/0056160 A1 | 3/2010 | Kim et al. .................... 455/444 | |
| 2010/0056184 A1 | 3/2010 | Vakil et al. | |
| 2010/0062791 A1* | 3/2010 | Wang et al. ............... 455/456.1 | |
| 2010/0290389 A1* | 11/2010 | Hou ...................... | H04W 48/12 370/328 |

(Continued)

FOREIGN PATENT DOCUMENTS

| | | | |
|---|---|---|---|
| CN | 101300798 | 11/2008 | ............. H04L 12/66 |
| CN | 101496309 | 7/2009 | ............... H04B 7/26 |

(Continued)

OTHER PUBLICATIONS

Of "Low Consumption Home Femto Base Stations" by Ivaylo Haratcherev and Carine Balageas published in IEEE Xplore Dec. 2009.*

(Continued)

*Primary Examiner* — Dai A Phuong
(74) *Attorney, Agent, or Firm* — Baker Botts L.L.P.

(57) ABSTRACT

A method for activating a femto base station includes transmitting at least one binding message that binds at least one access point with a collocated femto base station. The method also includes determining the collocated femto base station is in a power saving mode. The method additionally includes transmitting via the access point a request requesting that the collocated femto base station is put into an operational mode.

27 Claims, 3 Drawing Sheets

(56) References Cited

U.S. PATENT DOCUMENTS

| | | | |
|---|---|---|---|
| 2010/0296498 A1* | 11/2010 | Karaoguz | H04W 88/10 370/338 |
| 2010/0330962 A1* | 12/2010 | Han | H04W 48/02 455/411 |
| 2011/0092234 A1 | 4/2011 | Kim et al. | |
| 2011/0105132 A1* | 5/2011 | Vasudevan et al. | 455/448 |
| 2012/0033611 A1* | 2/2012 | Wu | 370/328 |
| 2012/0046025 A1* | 2/2012 | Das et al. | 455/422.1 |
| 2012/0135743 A1* | 5/2012 | Ebiko | H04W 72/082 455/452.2 |
| 2012/0309393 A1* | 12/2012 | Shinojima | H04W 60/00 455/435.1 |
| 2014/0155077 A1* | 6/2014 | Maeder | H04W 52/0216 455/450 |
| 2015/0038189 A1* | 2/2015 | Backes | H04L 47/125 455/522 |

FOREIGN PATENT DOCUMENTS

| | | | | |
|---|---|---|---|---|
| EP | 2 184 939 A1 | 5/2010 | | H04W 52/02 |
| EP | 2 312 889 A1 | 4/2011 | | H04W 48/12 |
| EP | 2 355 594 A1 | 8/2011 | | H04W 52/02 |
| JP | 2009-531891 | 9/2009 | | H04W 36/14 |
| JP | 2010-074465 | 4/2010 | | H04W 8/18 |
| JP | 2010-093524 | 4/2010 | | H04B 1/40 |
| JP | 2012-507226 | 3/2012 | | H04W 52/02 |
| WO | 2009/22534 | 2/2009 | | H04W 24/02 |
| WO | WO 2010/002991 A1 | 1/2010 | | H04W 52/02 |
| WO | WO 2011/056770 A1 | 5/2011 | | H04W 48/16 |

OTHER PUBLICATIONS

Patents Act 1977: Search Report under Section 17(5), Dec. 29, 2011.

Chinese Office Action with English Translation; Application No. 201110275932.3; pp. 12, Jan. 6, 2014.

Japanese Office Action issued in Patent Appl. No. 2011-199640; 3 pages w/ English translation, Feb. 24, 2015.

* cited by examiner

METHOD AND SYSTEM FOR ACTIVATING A FEMTO BASE STATION

TECHNICAL FIELD

The present disclosure relates generally to methods and systems for activating a femto base station.

BACKGROUND

Various wireless technologies (e.g., 3G, 4G, 3GPP Long Term Evolution (LTE), LTE-Advanced (LTE-A), WiMAX, etc.) allow for the use of small, user installed, base stations, generally referred to as femto base stations (fBSs) (also known as femtocells in WiMAX or Home node-B in 3GPP). The fBS is provided to the user by a wireless service provider. The user installs the fBS in their home or office, generally referred to herein as a home or home location, to increase the quality and signal strength of the local wireless coverage. The fBS's backhaul connection to the wireless service provider's network (WSPN) is provided via the user's home network access (e.g., DSL). The fBS operates in a similar wireless fashion (e.g., uses the same licensed frequency band) to the wireless service provider's macro base stations (MBSs). Thus, the handover from the MBS to the fBS may be done without the user noticing (similar to the handover from one MBS to another).

Because, the fBSs operate in a similar wireless fashion to macro base stations, it may be possible for any endpoint using the same wireless service to establish a connection through the fBS. However, owners of the fBS may not want to make their fBSs available to the public, thus the owner may configure the fBS to only allow access from members of a closed subscription group (CSG) specified by the owner.

SUMMARY

The teachings of the present disclosure relate to methods and systems for activating a femto base station. For example, a method for activating a femto base station may include transmitting at least one binding message that binds at least one access point with a collocated femto base station. The method may also include determining the collocated femto base station is in a power saving mode. The method may additionally include transmitting via the access point a request requesting that the collocated femto base station is put into an operational mode.

Technical advantages of particular embodiments include reduced power consumption when a fBS enters a power saving mode and turns its air interface off. Another technical advantage of particular embodiments is that an endpoint can return the fBS to an operating mode even though the endpoint can not wireless communicate directly with the fBS because the fBS is in a power saving mode. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
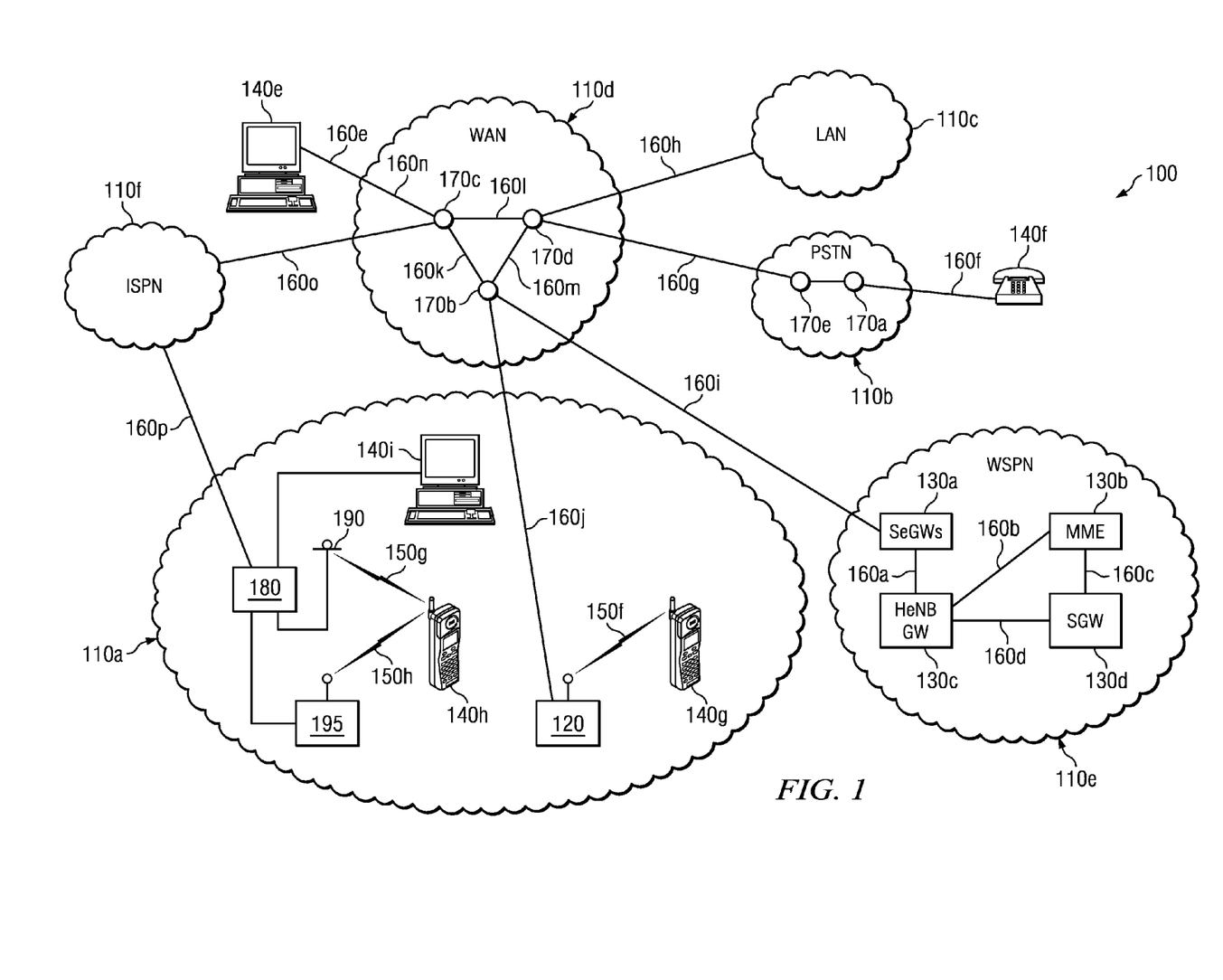
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, wireless access (e.g., via LTE or WiMAX wireless service) online gaming, data downloading, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16j), popularly known as WiMAX, which may include, among other components, macro base stations (MBSs), such as MBS 120, and femto base stations (fBSs), such as fBS 190. Using different features of networks 110, and their respective components, endpoint 140h, via access point 190, may be able to request that fBS 190 return from a power saving mode to an operational mode without having to communicate directly with fBS 190.

For simplicity and ease of discussion the remainder of this description may use a simplified nomenclature for the various entities, components, and networks discussed herein. 'Home location' may refer to a place at which a user has home network access to an external network, such as the Internet. A home location is not limited to only a user's residence—it may include, for example, a user's office. 'Home network access' may refer to any of a variety of techniques and/or technologies used to access one or more external networks, such as the internet, from the user's home location. For example, home network access may comprise a cable modem, a DSL modem, an xDSL modem, etc. 'Home network' may refer to a local area network (LAN) configured within a user's home location. The LAN may include both wired and wireless connections. The term 'internet' is not intended to be limited to only the Internet but includes any type of network, including public and private networks. 'Internet service provider' (ISP) may refer to an entity that provides a user with his home network access. 'Wireless service' may refer to any of a variety of techniques and technologies (e.g., WiMAX or LTE) used by a wireless service provider to provide endpoints with wireless connections over a large geographic area. 'Wireless service provider' (WSP) may refer to the entity that provides the wireless service. While this nomenclature is used for simplicity, it does not represent the entire scope of all possible embodiments. For example, an ISP may also be the WSP. As another example, the ISP may not be directly providing the user with internet access (e.g., the ISP may provide a building with internet access, the building user may then provide the fBS user with internet access).

The embodiment depicted in FIG. 1 includes fBS 190. fBS 190 may, in essence, be a small base station purchased (or leased) by the user from his WSP. Once installed, fBS 190 may provide a geographically small coverage area that may be used to enhance the signal coverage within the user's home location. In some embodiments, fBSs 190 may use the same wireless service as the surrounding base stations 120. For example, in particular embodiments, fBSs 190 may use the same licensed spectrum (e.g., the spectrum licensed by the user's WSP) as the WSP's other local MBS 120 and relay stations (not depicted). Depending on the scenario, the user may share his fBS's coverage with other, unknown users (e.g., the fBS is a public fBS), or he may limit it to known/authorized users (e.g., the fBS is a private fBS). The limited users may be referred as a CSG. Because each user may be operating their own fBS, they may be more inclined to use their fBS in a CSG type configuration.

Because each user and/or home location may have its own respective fBS 190, there may be a relatively high concentration of fBSs within a given area (e.g., an apartment complex). This may increase the chance and/or severity of wireless interference between adjacent fBSs and/or other base stations. One technique used to manage the interference in the network may be to turn off the wireless interface of fBS 190 when its service is not needed. For example, fBS 190 may switch off its transmission (and reception) when all the endpoints in the respective CSG are either away from home or powered off. In particular embodiments, when endpoint 140h is turned-on or returns home, endpoint 140h may restore fBS 190 using, for example, a WiFi connection with access point 195.

Although the example communication system 100 of FIG. 1 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired networking.

Networks 110 may include any number and combination of wired links 160, wireless connections 150, nodes 170 and/or endpoints 140. For purposes of illustration, and only by way of example, network 110a is a MAN that may be implemented, at least in part, via WiMAX or LTE; network 110b is a PSTN; network 110c is a LAN; network 110d is a WAN, such as the internet; network 110e is a WSPN which may be operated by the WSP responsible for providing network 110a with wireless service (e.g., WiMAX); and network 110f is an internet service provider network (ISPN) which may be operated by the ISP responsible for providing its users with home network access, including internet access. Though not depicted in FIG. 1, ISPN network 110f may include servers, modems, gateways and any other components that may be needed to provide their respective service.

While networks 110 have been depicted as six separate networks, depending on the scenario any two, or more, of the networks may be a single network. For example, the WSP and the ISP may be the same business entity which may maintain the necessary components for both services on the same network thus merging ISPN network 110f and WSPN network 110e into a single network. Furthermore, the interconnections between networks 110 may vary from those depicted in FIG. 1. For example, if a user uses a Digital Subscriber Line (DSL) for his internet access, his network access device 180 may connect to PSTN 110b.

Generally, networks 110 provide for the communication of packets, cells, frames, or other portions of information (generally referred to as packets herein) between endpoints 140 and/or nodes 170. In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e and/or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways. Similarly, PSTN 110b may be able to connect to other networks, including IP networks via interfaces or gateways.

Networks 110 may be connected to each other and with other networks via a plurality of wired links 160, wireless connections 150, and nodes 170. Not only do wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

In the depicted embodiment, wireless connections 150f and 150g may represent wireless links between base stations (e.g., MBS 120 or fBS 190) and endpoints 140 using, for example, WiMAX, whereas wireless connection 150h may represent a wireless link between access point 195 and endpoint 140h using, for example, WiFi. In other embodiments, wireless connections 150 may use other wireless technologies and/or protocols, such as LTE or LTE-A. The extended range of a WiMAX, LTE, or LTE-A MBS, along with one or more relay stations and fBSs, in certain cases, may allow network 110a to cover a larger geographic area associated with a MAN.

Nodes 170 may include any combination of network components, modems, session border controllers, gatekeepers, ISPN gateways, WSPN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170e may comprise a gateway. As a gateway node 170e may allow network 110b, a PSTN network, to be able to transmit and receive communications from other non-PSTN networks, such as network 110d, an IP network. More specifically, as a gateway, node 170e may translate communications between the various protocols used by networks 110b and 110d.

In particular embodiments, network 110e may comprise various servers, gateways, switches, routers, and other nodes used in providing wireless service. For example, WSPN 110e comprises mobility management entity (MME) 130b, security gateways 130a, serving gateway 130d, and home node gateway 130c. MME 130b may be responsible for storing, organizing, and/or maintaining bindings received from various endpoints. Security gateways 130a may comprise multiple, logically separate security gateways. While the gateways may be logically separated, they may physically be collocated or separated. Security gateways 130a may provide security to WSPN 110e for endpoints accessing WSPN 110e via the internet (e.g., via access point 195 as opposed to fBS 190) and/or for fBSs accessing WSPN 110e. In particular embodiments, this security may be provided by two logically separated security gateways. For example, one security gateway may be responsible for internet based connections while a second separate security gateway may be responsible for fBS based connections.

In particular embodiments, security gateways 130a may use a key (maintained by, for example, a home subscriber server (HSS) maintained, but not depicted, by WSPN 110e) to authenticate incoming requests, endpoints, and/or users. In some embodiments, the key that is used may be related to (or derived from) the authentication and encryption key used by the endpoint to access the wireless service (e.g., LTE) via its wireless service interface (e.g., LTE-Uu interface).

Home node gateway 130c may serve as a concentrator for the Control-Plane (e.g., the S1-MME interface). In some embodiments home node gateway 130c may terminate the user plane towards home node gateway 130c and towards serving gateway 130d. Home node gateway 130c may provide a relay function for relaying User Plane data between home node gateway 130c and serving gateway 130d. In some embodiments, home node gateway 130c may support NAS Node Selection Function (NNSF). While certain components have been described and depicted within WSPN 110e, a WSPN may include different, fewer, or additional components.

Network access devices 180 may provide home network access to fBS 190 and access point 195 through any combination of hardware, software embedded in a computer readable medium, and/or encoded logic incorporated in hardware or otherwise stored (e.g., firmware). In some embodiments, network access device 180 may be supplied by the user's ISP. For example, if the user's ISP is a cable company then the ISP may supply a cable modem as network access device 180. As another example, if the user's ISP is a phone company then the ISP may supply an xDSL modem as network access device 180. As may be apparent, network access device 180 may provide home network access to components other than fBSs 190 and access point 195. For example, the user may connect his personal computer to network access device 180 to access the internet.

Access point 195 may provide the user's home location with wireless network access. For example, access point 195 may be a WiFi router or access point. In certain embodiments, access point 195 may be one of many wireless access points within a user's home location. Access point 195 may provide wireless network access to a variety of devices within the user's home. In some embodiments, access point 195 may always be turned-on. Depending on the scenario, the user may enable one or more security features associated with access point 195. For example, in order for a device to establish a wireless connection with access point 195, the device may need to provide access point 195 with a security key (e.g., a Wired Equivalent Privacy (WEP) key or a WiFi Protected Access (WPA) key). In some embodiments, access point 195 may access WSPN 110e via one of the security gateways of security gateways 130a through an IP connection. The IP connection may or may not be secured (e.g., using IPSEC).

Endpoints 140 and/or nodes 170 may provide data or network services to a user through any combination of hardware, software embedded in a computer readable medium, and/or encoded logic incorporated in hardware or otherwise stored (e.g., firmware). For example, any one of endpoints 140 may be a cell phone, an IP telephone, a computer, a video monitor, a camera, a personal data assistant or any other hardware, software, and/or encoded logic that supports the communication of packets (or frames) using one or more of networks 110. Endpoints 140 may also include unattended or automated systems, gateways, other intermediate components, or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
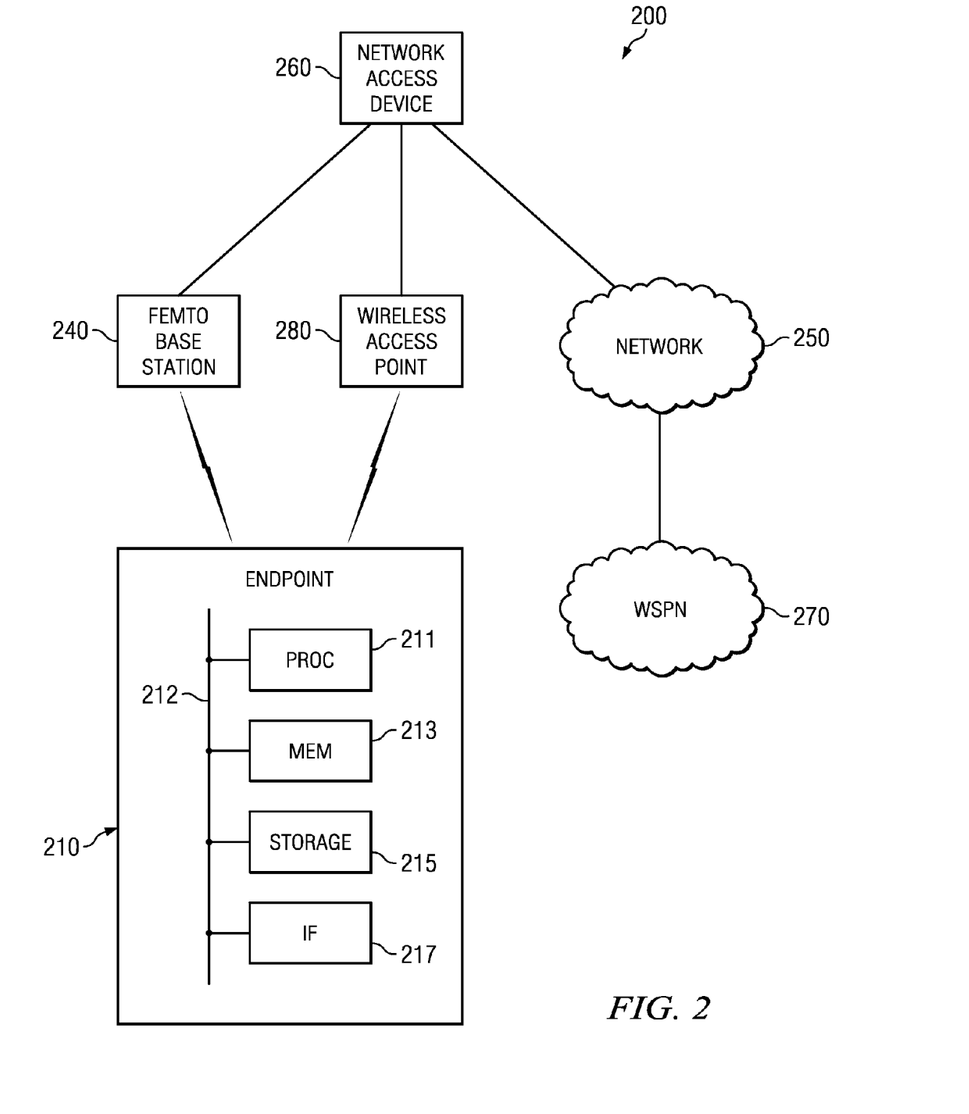
FIG. 2 illustrates a network comprising a more detailed view of an endpoint, in accordance with a particular embodiment.

FIG. 2 illustrates a network comprising a more detailed view of an endpoint, in accordance with a particular embodiment. The depicted network 200 is a simplified scenario comprising endpoint 210, fBS 240, network 250, network access device 260, WSPN network 270, and wireless access point 280 (WAP 280). In different embodiments, network 200 may comprise any number of wired or wireless networks, MBSs, endpoints, RSs, fBSs, and/or any other components that may facilitate or participate in the communication of data and/or signals whether via wired or wireless connections. Network 200 may comprise any of a variety of different wireless technologies, including, but not limited to, orthogonal frequency division multiple access (OFDMA), next generation wireless system such as LTE-A and 802.16m.

Endpoint 210 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein or provide functionality described or illustrated herein.

The components of endpoint 210 may comprise any suitable physical form, configuration, number, type and/or layout. As an example, and not by way of limitation, endpoint 210 may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, endpoint 210 may include one or more computer systems; be unitary or distributed; span multiple locations; span multiple machines; or reside in a cloud, which may include one or more cloud components in one or more networks.

Where appropriate, endpoint 210 may perform without substantial spatial or temporal limitation one or more steps of one or more methods described or illustrated herein. As an example, and not by way of limitation, endpoint 210 may perform in real time or in batch mode one or more steps of one or more methods described or illustrated herein. One or more endpoints may perform at different times or at different locations one or more steps of one or more methods described or illustrated herein, where appropriate.

In the depicted embodiment, endpoint 210 may include processor 211, memory 213, storage 215, interface 217, and bus 212. These components may work together to facilitate returning fBS 240 from a power saving mode to an operational mode via WAP 280. Although a particular network is depicted as having a particular number of particular components in a particular arrangement, this disclosure contemplates any suitable network 200 having any suitable number of any suitable components in any suitable arrangement. For simplicity, only the components of endpoint 210 are depicted. Other devices in network 200 may have one or more of the components described below with respect to endpoint 210.

Processor 211 may be a microprocessor, controller, or any other suitable computing device, resource, or combination of hardware, software and/or encoded logic operable to provide, either alone or in conjunction with other components (e.g., memory 213), the ability to activate fBS 240 via WAP 280. Such functionality may include providing various features discussed herein. For example, processor 211 may determine when endpoint 210 is within a user's home location and when to send a request via WAP 280 for fBS 240 to return to an operational mode and turn-on its wireless interface. Additional examples and functionality provided, at least in part, by processor 211 will be discussed below.

In particular embodiments, processor 211 may include hardware for executing instructions, such as those making up a computer program. As an example, and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215. The instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. Memory 213 may store any suitable data or information utilized by endpoint 210, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. As an example and not by way of limitation, endpoint 210 may load instructions from storage 215 or another source (such as, for example, another computer system, another base station, or a remote transceiver) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

Bus 212 may include any combination of hardware, software embedded in a computer readable medium, and/or encoded logic incorporated in hardware or otherwise stored (e.g., firmware) to couple components of endpoint 210 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses, as described below. In particular embodiments, one or more memory management units (MMUs) may reside between processor 211 and memory 213 and facilitate accesses to memory 213 requested by processor 211. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate.

In particular embodiments, storage 215 may include mass storage for data or instructions. As an example and not by way of limitation, storage 215 may include an HDD, a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to endpoint 210, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include hardware, encoded software, or both providing one or more interfaces for communication (such as, for example, packet-based communication) between endpoint 210, fBS 240, any networks, any network devices, and/or any other computer systems. As an example and not by way of limitation, communication interface 217 may include a network interface controller (NIC) or network adapter for communicating with an Ethernet or other wire-based network and/or a wireless NIC (WNIC) or wireless adapter for communicating with a wireless network. In certain embodiments, interface 217 may comprise two separate wireless interfaces. For example, in particular embodiments, interface 217 may comprise a first wireless interface, such as a WiFi interface, for communicating with WAP 280 and a second wireless interface, such as an LTE-A interface, for communicating with fBS 240.

In some embodiments, interface 217 may comprise one or more radios coupled to one or more antennas. In such an embodiment, interface 217 may receive digital data that is to be sent out to wireless devices, such as endpoints, via a wireless connection. The radio may convert the digital data into a radio signal having the appropriate center frequency, bandwidth parameters, and transmission power. Similarly, the radios may convert radio signals received via the antenna into digital data to be processed by, for example, processor 211.

Depending on the embodiment, interface 217 may be any type of interface suitable for any type of network. As an example and not by way of limitation, interface 217 may be used to communicate with an ad-hoc network, a personal area network (PAN), a local area network (LAN), a wide area network (WAN), a metropolitan area network (MAN), or one or more portions of the internet or a combination of two or more of these. One or more portions of one or more of these networks may be wired or wireless. As an example, endpoint 210 may communicate with a wireless PAN (WPAN) (such as, for example, a BLUETOOTH WPAN), a Wi-Fi network, a WiMAX network, an LTE network, an LTE-A network, a cellular telephone network (such as, for example, a Global System for Mobile Communications (GSM) network), or any other suitable wireless network or a combination of two or more of these. Endpoint 210 may include any suitable interface 217 for any one or more of these networks, where appropriate.

In some embodiments, interface 217 may include one or more interfaces for one or more I/O devices. One or more of these I/O devices may enable communication between a person and endpoint 210. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more device or encoded software drivers enabling processor 211 to drive one or more of these I/O devices. Interface 117 may include one or more interfaces 117, where appropriate.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more non-transitory computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Network 250 may comprise one or more separate but interconnected networks operated by one or more different operators. For example, network 250 may comprise separate networks for multiple ISPs. A user may use their ISP's network for their home network access at their home location. In providing the user with home network access, the ISP's network may include modems, servers, and gateways (e.g., an ISP gateway). Network 250 may comprise any number of additional networks including, but not limited to, the internet, a LAN, WAN, MAN, PSTN or some combination of the above.

WSPN 270 may comprise a wireless service provider's network. WSPN 270 may support a WSP's wireless network that provides users with wireless service over a large geographic area. The wireless network may support technologies and/or protocols such as a WiMAX, LTE-A, or LTE. WSPN 270 may include servers, MMES, gateways, serving gateways, security gateways, and other components, including any components discussed above with respect to WSPN 110e.

fBS 240 may, in essence, be a small base station providing wireless service within a user's home location. Depending on the embodiment and configuration of fBS 240 it may be public or private. The backhaul connection from fBS 240 to WSPN 270 may use the user's home network access provided via network access device 260 by the user's ISP. WSPN 270 may use this backhaul connection to configure various features and settings, such as the frequency, channel and/or power, used by fBS 240. In certain embodiments, the backhaul connection may be used by WSPN 270 to activate or de-activate the wireless interface of fBS 240 and/or return fBS 240 to an operational mode after receiving a request from endpoint 210.

Network access device 260 may comprise any of a variety of features and/or functionality found in stand alone devices such as wireline routers and Wi-Fi (802.11) access points. In certain embodiments, WAP 280 and network access device 260 may comprise a single device. For example, an ISP may provide a cable modem with a built-in wireless router. The combined device may provide the user with both wired and wireless home network access.

In particular embodiments, WAP 280 may provide the user's home location with wireless network access. For example, WAP 280 may be a WiFi router or access point. In certain embodiments, WAP 280 may be one of many wireless access points within a home location. WAP 280 may provide wireless network access to a variety of devices within the user's home. In some embodiments, WAP 280 may always be turned-on. Depending on the scenario, the user may enable one or more security features associated with WAP 280. For example, in order for a device to establish a wireless connection with WAP 280, the device may need to know a security key (e.g., WEP key or a WPA key).

The following examples may help to illustrate how these components work with one another to provide some of the functionality of particular embodiments. For purposes of this example, it may be assumed that fBS 240 is an LTE Home node-B and that WAP 280 is a WiFi based WAP. Other examples may comprise different WAPs and/or fBSs. In this example, interface 217 comprises a WiFi interface and an LTE interface. Thus, endpoint 210 may be able to establish wireless connections with both WAP 280 and fBS 240.

Depending on the scenario, the user may configure fBS 240 with a CSG. The CSG may limit access to fBS 240 to those devices specified by the user in the CSG. Endpoint 210 may be a member of the CSG. In certain embodiments, the user may also configure each endpoint or device in the CSG with an appropriate security key to access WAP 280. The security key may be used to ensure the endpoint is authorized to request that fBS 240 returns to an operational mode.

Once endpoint 210 is able to connect to fBS 240, a high layer message exchange may occur in which endpoint 210 learns that fBS 240 is a fBS that it can access. Storage 215 may store a cell ID (e.g., a 28 bit E-UTRAN cell ID or ECI) associated with fBS 240 in a register of accessible fBSs. Another exchange of messages between endpoint 210 and WAP 280 may provide endpoint 210 with a MAC address for WAP 280. This MAC address may be stored in storage 215.

When endpoint 210 is connected to both WAP 280 and fBS 240 at the same time, processor 211 may establish a binding of WAP 280 and fBS 240. The binding indicates that WAP 280 and fBS 240 are located within the user's home location. This may be based on the fact that endpoint 210 is able to connect to both fBS 240 and WAP 280 at approximately the same time. In particular embodiments, the binding may have the following form: <WAP MAC Address, fBS ECI>. The binding may be stored by storage 215 and sent, via interface 217, to WSPN 270 so that the binding may be registered by the WSP. If there are multiple WAPs that endpoint 210 can access while also being connected to fBS 240, then multiple bindings may be generated and transmitted to the WSP. Each WAP and fBS pair may comprise its own binding.

In certain embodiments, the binding may be sent as a management message directed to an MME within WSPN 270. The management message may indicate that WAP 280 and fBS 240 are collocated and that endpoint 210 has requested that they be bound to one another. The MME may authenticate the message and, if authenticated, the MME may register the binding for endpoint 210. This may be done for multiple bindings from endpoint 210.

In particular embodiments, a binding may have a limited life time (e.g., 10 days). At the expiration of the binding's lifetime endpoint 210 may delete it. The binding may be renewed or otherwise prevented from being deleted by endpoint 210 upon determining that both WAP 280 and fBS 240 are still servicing the user's home location. In some embodiments, Endpoint 210 may renew the binding by going through the same process as the initial binding. The limited lifetime may reduce the likelihood of a binding being stored by endpoint 210 indefinitely. Then, if WAP 280 or fBS 240 are disabled or moved to another location, endpoint 210 may not mistakenly assume that WAP 280 and fBS 240 are still collocated. In certain situations, when a binding is deleted by endpoint 210, endpoint 210 may send a message to the MME indicating that the MME is to delete the same binding. This may aid in keeping the binding in sync between endpoint 210 and the MME. In certain embodiments, the limited lifetime of the binding may also apply to the binding stored by the MME.

When fBS 240 fails to detect any active and authorized endpoints (e.g., endpoints that are part of the CSG), fBS 240 may turn off its wireless interface and enter a power saving mode. fBS 240 may be unable to detect any active and authorized endpoints because the endpoints are themselves powered-off (or otherwise have their LTE wireless interface deactivated) or are outside of the wireless range of fBS 240. By turning off the wireless interface, fBS 240 may enter a power saving mode to conserve energy and to reduce interference to other base stations. However, because the wireless interface is turned off, there may not be a way for endpoint 210 to wirelessly send a message directly to fBS 240 to turn the wireless interface back on.

With fBS 240's wireless interface turned-off, when endpoint 210 looks for fBS 240 (e.g., when it returns home and wants to hand over from the MBS to fBS 240, or when endpoint 210 is powered-on) endpoint 210 may be unable to find a signal from fBS 240. However, because the endpoint is in the user's home, and WAP 280 is always powered on, interface 217 may be able to establish a connection with WAP 280. In some embodiments, the WiFi interface of endpoint 210 may be activated based on certain conditions, such as when an LTE signal is unavailable or below a certain service threshold. When interface 217 detects WAP 280 but not fBS 240, processor 211 may recognizes that endpoint 210 is at home and fBS 240 is in power saving mode. Processor 211 may then generate a message requesting fBS 240 return to an operational mode. The message may be sent via WAP 280 to WSPN 270.

The following scenario may illustrate a particular example in which endpoint 210 activates fBS 240. In this scenario the WiFi interface (or any other interface it has which is actively connected to the Internet) of interface 217 may be used to send a message to WSPN 270. The message may be directed within WSPN 270 to the MME which has the bindings stored therein. The message may contain the binding between WAP 280 and fBS 240 and may request that WSPN 270 return fBS 240 to an operational mode. In some embodiments, endpoint 210 may encrypt (and/or authenticate) the message using a key shared between endpoint 210 and the MME. In some embodiments, endpoint 210 may also encrypt (and/or authenticate) the message with a security gateway (e.g., a security gateway serving fBS 240) associated with WSPN 270. This security gateway may be the same, or a separate, security gateway used by endpoint 210 to communicate with WSPN 270 through the internet. The security key may be shared between endpoint 210 and the security gateway. In some embodiments, the same key may be reused for the security gateway and the MME.

Once endpoint 210 and the binding identified in the message from endpoint 210 have been validated and/or authenticated, the MME may send a request within WSPN 270 to the home nodeB gateway (in LTE terminology). The request may contain the fBS ID provided in the binding message (e.g., associated with fBS 240). The home nodeB gateway may then sends an activation command to fBS 240 which may return fBS 240 to an operational mode.

In certain embodiments, a security gateway may comprise an interface that endpoint 210 uses to communicate with WSPN 270 when endpoint 210 is not using its the LTE interface. In certain embodiments, WSPN 270 may use two separate security gateways, one for communications sent from a non-LTE interface and one for fBS security. The two security gateways may be run on the same or different servers. In certain embodiments, the interface of the security gateway may be used for a variety of features and functions provided to endpoints when they are not using their LTE (or WiMAX) interface. For example, the interface may be used for operation, administration and maintenance (OAM) purposes, such as downloading endpoint firmware, or reporting poor or no coverage. It may also save spectrum usage for the WSP by allowing WSPN 270 to receive communications without having to use its wireless service.

In particular embodiments, the WSP may use the bindings stored for different users to determine the location of the associated fBS and/or WAP. This may allow for increased accuracy and/or availability of location-based services based on the location of the fBSs, WAPs, or a mixture of both. For example, the WSP may be able to determine the location of fBS 240, then when it receives a binding with WAP 280, the WSP may then know the location of WAP 280. The WSP may then use this location information to build a WiFi location database that it can use for WiFi-based positioning services.

Thus far, several different embodiments and features have been presented. Particular embodiments may combine one or more of these features depending on operational needs and/or component limitations. This may allow for great adaptability of network 200 to the needs of various organizations and users. For example, in particular embodiments, WAP 280 may be combined with network access device 260. Some embodiments may include additional or different features. In particular embodiments, the functionality of endpoint 210 may be provided by additional or different devices.

Figure 3:
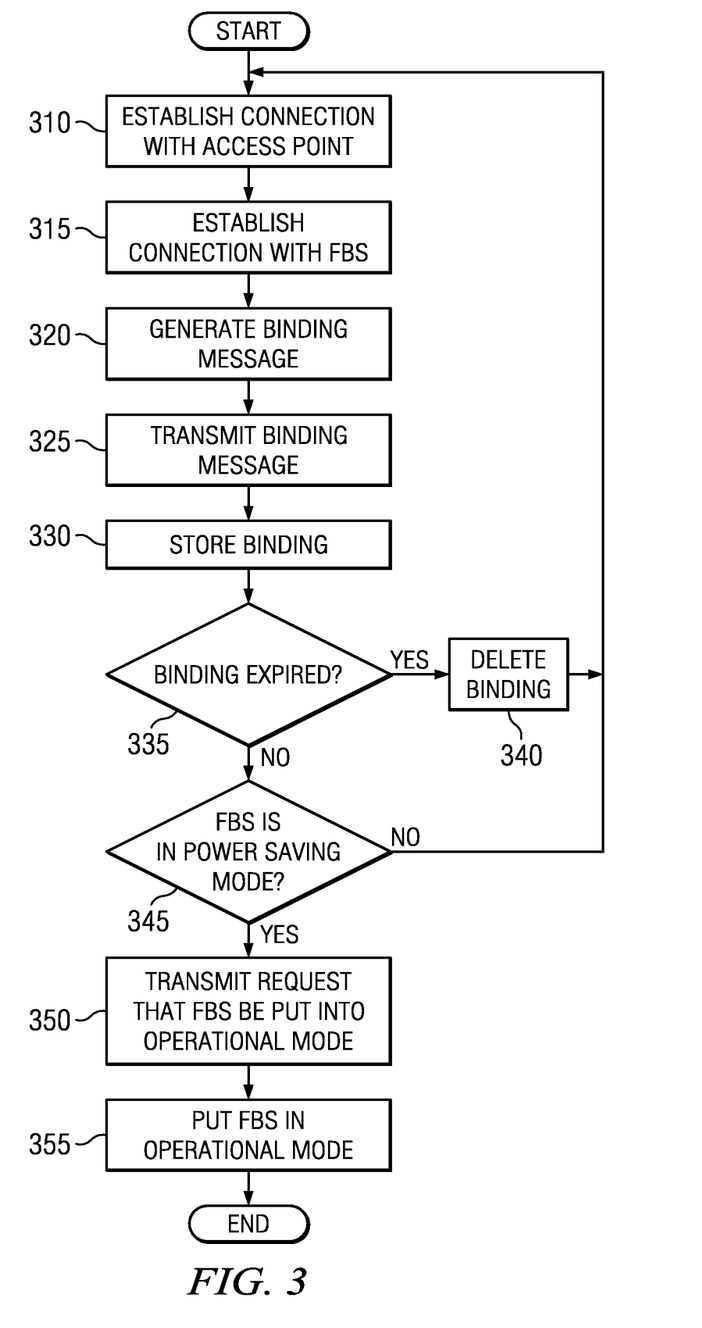
FIG. 3 illustrates a method for activating a femto base station, in accordance with a particular embodiment.

FIG. 3 illustrates a method for activating a femto base station, in accordance with a particular embodiment. It may be assumed, for purposes of this method, that a user's endpoint has two wireless interfaces, such as an LTE interface and a WiFi interface. Other endpoints may comprise other and/or additional interfaces. It may also be assumed that the user has home network access that is accessible by both an LTE fBS and a WiFi access point. For purposes of this method it may also be assumed that the fBS has been properly authenticated and activated by the WSPN. It may further be assumed that the endpoint used in this method is member of a CSG configured on the fBS.

The method begins at step 310 with the endpoint establishing a WiFi connection with WAP. The WAP may provide wireless home network access to various devices and/or components within a user's home location. In some embodiments the WAP may use one or more security features to limit and/or control access to the user's wireless network or home network access. For example, the WAP may require a WPA key to establish a connection.

At step 315 the endpoint establishes an LTE connection with the fBS. The fBS may operate using the same licensed spectrum as nearby macro base stations and/or the same licensed spectrum licensed by the WSP that provided the user with the fBS. In certain embodiments, the fBS may authenticate the user's endpoint and verify that the endpoint and/or user are within the CSG. In certain embodiments, one or more components of the WSPN may authenticate the user's endpoint and/or fBS.

At step 320 the endpoint generates a binding message binding the WAP and the fBS. In particular embodiments the binding message may comprise a MAC address associated with the WAP and a fBS identifier associated with the fBS. In general, the binding indicated in the binding message may indicate that the WAP and fBS are both located within the user's home location. In particular embodiments, to ensure that the fBS and WAP are collocated, the endpoint may generate the binding message when it is able to establish a connection with both the WAP and the fBS at approximately the same time.

At step 325 the endpoint transmits the binding message to the WSPN. In some embodiments, the binding message may be sent via a secure connection. For example, the binding message may be sent using PGP. Depending on the embodiment and/or scenario, the binding message may be sent via the WAP or via the fBS. In some embodiments, the WSPN may comprise a security gateway that is able to receive the binding message and pass it on to the correct component within the WSPN (e.g., a MME). In particular embodiments, the security gateway may comprise at least two different interfaces, one for receiving communications from fBSs and one for receiving communications from endpoints via the internet (e.g., without being sent through the WSP's base station).

At step 330 the binding is stored. The binding transmitted via the binding message may be stored at both the endpoint and the WSPN. For example, an MME within the WSPN may contain a table, data base, or other organization of data that lists active bindings. In some embodiments, the bindings may be stored with a time stamp. The time stamp may be used to determine whether a binding has expired (e.g., based on how long it has been since the binding was generated or renewed).

At step 335 a determination is made as to whether the stored binding has expired. The determination may be made at the endpoint, the WSPN, or both. In order to avoid having the binding deleted, the endpoint may periodically renew the binding (e.g., repeating steps 310-330) when it is determined that the fBS is not in a power saving mode (see step 345). If it is determined that the binding has expired, and the endpoint is unable to connect to both the WAP and the fBS, then at step 340 the binding is deleted. The binding may initially be deleted by the endpoint, the WSPN or both. In some embodiments, whenever a binding is deleted, the deleting device (e.g., the endpoint or the WSPN) may send a message to the other device alerting the other device that the binding has been deleted. This may ensure that the bindings are synchronized between the devices.

At step 345 the endpoint makes a determination as to whether the fBS is in a power saving mode. The fBS may have entered a power saving mode because all the endpoints within the CSG were powered-off (or had otherwise disabled their LTE interface) or had moved out of range of the fBS. If the fBS is in an operational mode, the endpoint may repeat steps 310-330 to renew the binding, effectively re-binding the fBS and the WAP.

If the fBS is in a power saving mode, then at step 350 the endpoint may transmit a request to the WSPN requesting that the fBS return to an operational mode. The request may be generated and transmitted when the endpoint detects the WAP, indicating that the endpoint is at the user's home location and is within range of the fBS. In particular embodiments, the request may include the binding or some other indication that the WSPN can use to identify the binding transmitted by the endpoint at step 325 and received by the WSPN. When the WSPN receives the request it may verify that it is a valid request and locate the indicated binding.

At step 355 the fBS is put into an operational mode. This may comprise the WSPN sending a request to the fBS requesting that the fBS be put into an operational mode. The request sent to the fBS may use a different interface than the interface used to receive the request at step 350. When the fBS receives the request from the WSPN, the fBS may return to an operational mode thereby allowing the endpoint to establish an LTE connection with the fBS.

While the embodiment depicted in FIG. 3 includes a certain number of steps, depicted in a certain order, it is to be understood that other embodiments may have more, fewer or different steps, and the steps may be rearranged. For example, in some embodiments the endpoint may repeat steps 310-330 for a second, additional, WAP within the home location. As another example, the order of steps 310 and 315 may switch in scenarios in which the endpoint connects to the fBS first and then to the WAP.

Although particular embodiments have been described in detail, it should be understood that various other changes, substitutions, and alterations may be made hereto without departing from the spirit and scope of particular embodiments. For example, although an embodiment has been described with reference to a number of elements included within communication system 100 such as endpoints, fBSs, and MBSs, these elements may be combined, rearranged or positioned in order to accommodate particular routing architectures or needs. In addition, any of these elements may be provided as separate external components to communication system 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed:

1. A method for activating a femto base station from an endpoint, comprising:
transmitting from the endpoint at least one binding message that binds at least one local area network access point with a collocated femto base station, wherein the local area network access point and the collocated femto base station are coupled to a wireless service provider network via the internet, and wherein the local area network access point provides the endpoint access to the wireless service provider network via the internet;
determining the collocated femto base station is in a power saving mode; and
transmitting from the endpoint via the local area network access point a request requesting that the collocated femto base station is put into an operational mode, wherein
transmitting the at least one binding message comprises transmitting the at least one binding message to a wireless service provider's network via a secure connection, and
wherein the binding between the at least one local area network access point and the collocated femto base station occurs for a limited period.

2. The method of claim 1, further comprising:
establishing a first connection with the at least one access point;
establishing a second connection with the femto base station; and
upon concurrently maintaining the first and second connections, generating the at least one binding message.

3. The method of claim 1, further comprising, periodically transmitting at least one additional binding message that re-binds the at least one access point with the collocated femto base station.

4. The method of claim 1, wherein the binding message comprises a MAC address associated with the at least one access point and a femto base station identifier associated with the collocated femto base station.

5. The method of claim 1, further comprising transmitting at least one additional binding message that binds at least one additional access point with the collocated femto base station.

6. A method for activating a femto base station, comprising:
- receiving a binding message from an endpoint, the binding message identifying a local area network access point and a femto base station collocated with the local area network access point, wherein the local area network access point and the collocated femto base station are coupled to a wireless service provider network via the internet, and wherein the local area network access point provides the endpoint access to the wireless service provider network via the internet;
- storing a first binding based on the binding message;
- at the local area network access point, receiving a first request from the endpoint comprising the first binding, the first request requesting that the femto base station be put into an operational mode; and
- transmitting a second request from the local area network access point to the femto base station requesting that the femto base station be put into an operational mode, the first request and the second request using different interfaces, wherein
- receiving the binding message from the endpoint comprises receiving the binding message sent to the wireless service provider's network via a secure connection, and
- wherein the first binding between the local area network access point and the femto base station occurs for a limited period.

7. The method of claim 6, further comprising authenticating the first endpoint.

8. The method of claim 6, further comprising:
- determining that the first binding has expired; and
- deleting the first binding request.

9. The method of claim 6, wherein the first binding message comprises a MAC address associated with the access point and a femto base station identifier associated with the femto base station.

10. An endpoint for activating a femto base station, comprising:
- an interface configured to transmit at least one binding message that binds at least one local area network access point with a collocated femto base station, wherein the local area network access point and the collocated femto base station are coupled to a wireless service provider network via the internet, and wherein the local area network access point provides the endpoint access to the wireless service provider network via the internet; and
- a processor coupled to the interface and configured to determine the collocated femto base station is in a power saving mode;
- wherein the interface is further configured to transmit via the local area network access point a request requesting that the collocated femto base station is put into an operational mode, wherein the interface configured to transmit the at least one binding message is further configured to transmit the at least one binding message to a wireless service provider's network via a secure connection, and
- wherein the binding between the at least one local area network access point and the collocated femto base station occurs for a limited period.

11. The system of claim 10, wherein the interface is further configured to:
- establish a first connection with the at least one access point;
- establish a second connection with the femto base station; and
- upon concurrently maintaining the first and second connections, generate the at least one binding message.

12. The system of claim 10, wherein the interface is further configured to periodically transmit at least one additional binding message that re-binds the at least one access point with the collocated femto base station.

13. The system of claim 10, wherein the binding message comprises a MAC address associated with the at least one access point and a femto base station identifier associated with the collocated femto base station.

14. The system of claim 10, wherein the interface is further configured to transmit at least one additional binding message that binds at least one additional access point with the collocated femto base station.

15. A local area network access point for activating a femto base station, comprising:
- an interface configured to receive a binding message from an endpoint, the binding message identifying the local area network access point and a femto base station collocated with the local area network access point, wherein the local area network access point and the collocated femto base station are coupled to a wireless service provider network via the internet, and wherein the local area network access point provides the endpoint access to the wireless service provider network via the internet; and
- a processor coupled to the interface and configured to have a first binding based on the binding message stored;
- wherein the interface is further configured to:
  - receive a first request from the endpoint comprising the first binding, the first request requesting that the femto base station be put into an operational mode; and
  - transmit a second request to the femto base station requesting that the femto base station be put into an operational mode, the first request and the second request using different interfaces, wherein
- receiving the binding message from the endpoint comprises receiving the binding message sent to the wireless service provider's network via a secure connection, and
- wherein the first binding between the local area network access point and the femto base station occurs for a limited period.

16. The system of claim 15, wherein the processor is further configured to authenticate the first endpoint.

17. The system of claim 15, wherein the processor is further configured to:
- determine that the first binding has expired; and
- have the first binding request deleted.

18. The system of claim 15, wherein the first binding message comprises a MAC address associated with the access point and a femto base station identifier associated with the femto base station.

19. One or more computer-readable non-transitory storage media embodying software that when executed by a processor is operable to:
- transmit from an endpoint at least one binding message that binds at least one local area network access point with a collocated femto base station, wherein the local area network access point and the collocated femto base station are coupled to a wireless service provider network via the internet, and wherein the local area network access point provides the endpoint access to the wireless service provider network via the internet;
- determine the collocated femto base station is in a power saving mode;
- transmit from the endpoint via the local area network access point a request requesting that the collocated femto base station is put into an operational mode, wherein the software that when executed is configured to transmit at least one binding message is further configured to transmit at least one binding message to a wireless service provider's network via a secure connection, and
- wherein the binding between the at least one local area network access point and the collocated femto base station occurs for a limited period.

20. The media of claim 19, wherein the software, when executed, is further configured to:
- establish a first connection with the at least one access point;
- establish a second connection with the femto base station; and
- upon concurrently maintaining the first and second connections, generate the at least one binding message.

21. The media of claim 19, wherein the software, when executed, is further configured to periodically transmitting at least one additional binding message that re-binds the at least one access point with the collocated femto base station.

22. The media of claim 19, wherein the binding message comprises a MAC address associated with the at least one access point and a femto base station identifier associated with the collocated femto base station.

23. The media of claim 19, wherein the software, when executed, is further configured to transmit at least one additional binding message that binds at least one additional access point with the collocated femto base station.

24. One or more computer-readable non-transitory storage media embodying software that when executed by a processor is operable to:
- receive a binding message from an endpoint, the binding message identifying a local area network access point and a femto base station collocated with the local area network access point, wherein the local area network access point and the collocated femto base station are coupled to a wireless service provider network via the internet, and wherein the local area network access point provides the endpoint access to the wireless service provider network via the internet;
- store a first binding based on the binding message;
- at the local area network access point, receive a first request from the endpoint comprising the first binding, the first request requesting that the femto base station be put into an operational mode; and
- transmit a second request from the local area network access point to the femto base station requesting that that the femto base station be put into an operational mode, the first request and the second request using different interfaces, wherein
- receiving the binding message from the endpoint comprises receiving the binding message sent to the wireless service provider's network via a secure connection, and
- wherein the first binding between the local area network access point and the femto base station occurs for a limited period.

25. The media of claim 24, wherein the software, when executed, is further configured to authenticate the first endpoint.

26. The media of claim 24, wherein the software, when executed, is further configured to:
- determine that the first binding has expired; and
- delete the first binding request.

27. The media of claim 24, wherein the first binding message comprises a MAC address associated with the access point and a femto base station identifier associated with the femto base station.

* * * * *